(12) United States Patent
Mohammed

(10) Patent No.: US 11,381,678 B2
(45) Date of Patent: Jul. 5, 2022

(54) CALL SET UP FAILURE RATE METRIC AND COMMUNICATION NETWORK OPTIMIZATION BASED THEREON

(71) Applicant: T-Mobile USA, Inc., Bellevue, WA (US)

(72) Inventor: Zain us salekin Mohammed, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 107 days.

(21) Appl. No.: 16/880,558

(22) Filed: May 21, 2020

(65) Prior Publication Data

US 2021/0368040 A1    Nov. 25, 2021

(51) Int. Cl.
| | |
|---|---|
| H04M 3/00 | (2006.01) |
| H04M 3/22 | (2006.01) |
| H04M 3/42 | (2006.01) |
| H04W 24/08 | (2009.01) |
| H04M 3/26 | (2006.01) |
| H04M 3/24 | (2006.01) |

(52) U.S. Cl.
CPC ....... *H04M 3/2218* (2013.01); *H04M 3/2227* (2013.01); *H04M 3/24* (2013.01); *H04M 3/26* (2013.01); *H04M 3/42221* (2013.01); *H04W 24/08* (2013.01)

(58) Field of Classification Search
CPC .... H04M 3/2218; H04M 3/2227; H04M 3/24; H04M 3/26; H04M 3/42221; H04W 24/08
See application file for complete search history.

(56) References Cited

U.S. PATENT DOCUMENTS

| | | | | |
|---|---|---|---|---|
| 7,136,636 | B1 * | 11/2006 | McLaughlin | H04M 15/90 379/112.01 |
| 8,688,072 | B1 * | 4/2014 | Agarwal | H04W 12/06 455/410 |
| 10,477,032 | B2 * | 11/2019 | Kovacs | H04M 15/56 |
| 2015/0280973 | A1 * | 10/2015 | Ko | H04W 24/08 370/242 |
| 2016/0029228 | A1 | 1/2016 | Mufti | |
| 2016/0135067 | A1 * | 5/2016 | Morad | H04W 64/003 455/423 |
| 2018/0270346 | A1 * | 9/2018 | Donnenwirth | H04W 4/24 |
| 2018/0309616 | A1 * | 10/2018 | Kollipara | H04L 41/507 |
| 2020/0186449 | A1 * | 6/2020 | Tofighbakhsh | H04L 43/04 |

FOREIGN PATENT DOCUMENTS

| | | | | |
|---|---|---|---|---|
| CN | 106792822 A | * | 5/2017 | |
| EP | 3393084 A1 | * | 10/2018 | ......... H04L 41/0631 |
| WO | 2017025773 A1 | | 2/2017 | |
| WO | 2017037598 A1 | | 3/2017 | |

* cited by examiner

*Primary Examiner* — Khai M Nguyen
(74) *Attorney, Agent, or Firm* — Loeb & Loeb LLP

(57) ABSTRACT

A computer-implemented method includes generating at least one call detail record for each call initiated on a communication network, aggregating the call detail records generated over a predetermined time period to provide an aggregated call detail record, and calculating a call set up failure rate for the calls from the aggregated call detail record, wherein the call set up failure rate is a measure of the amount of calls that failed prior to ringing at a called party's device. The computer-implemented method further includes adjusting parameters of the communication network when the call set up failure rate is above a threshold.

15 Claims, 5 Drawing Sheets

Date: 04/20/2019

| Time | Cell ID | Orig. Device | Term. Device | Status | Failure Stage |
|---|---|---|---|---|---|
| 07:00:02 | Tuscon, AZ <XXXXXXX> | ########## | ########## | Answered | N/A |
| 07:08:10 | Sacramento, CA <XXXXXXX> | ########## | ########## | Unanswered | Calling party abort |
| 07:13:13 | Nashville, TN <XXXXXXX> | ########## | ########## | Unanswered | N/A |
| 07:17:42 | Houston, TX <XXXXXXX> | ########## | ########## | Failed | Attempt (183SIP) |
| 07:31:38 | Los Angeles, CA <XXXXXXX> | ########## | ########## | Answered | N/A |
| 07:33:22 | Milwaukee, WI <XXXXXXX> | ########## | ########## | Failed | Attempt (183SIP) |

Call Set Up Failure Rate = 0.05

FIG. 4

CALL SET UP FAILURE RATE METRIC AND COMMUNICATION NETWORK OPTIMIZATION BASED THEREON

TECHNICAL FIELD

Embodiments discussed herein generally relate to methods and systems for providing a metric for call set up failure rates, and for optimizing a communication network based on the call set up failure rates.

BACKGROUND

Communications between parties via user devices are invaluable for many personal and professional purposes. These communications may include voice calls and video calls supported by communication networks including mobile networks (4G, 5G, etc.), WiFi networks, and the Internet. In voice over long-term evolution (VoLTE) calls, the voice calls are made over a 4G LTE communication network. In VoLTE, voice data packets are sent over the Internet, and the voice data packets are given priority over other types of data packets to provide high definition voice quality. VoLTE also provides faster connection speeds and higher data transfer rates compared to 2G and 3G networks that use circuit switched protocols.

In some circumstances, a voice call initiated on a network by a calling party may fail during call set up on the network before a notification (e.g., a ring) is received by the called party. The calling party must then redial to initiate the call again. Such call failures may inconvenience the network subscribers, and waste network resources. Calls may fail during call set up for various reasons such as network delays in call set up signaling and response times as may occur during traveling of the calling party or the called party, failure to receive a message at the originating or terminating side within a predetermined time limit, failure to establish a dedicated bearer for the voice call, failures during circuit switched fall back (CSFB) from an LTE network, or issues at the radio access network (RAN). The rate at which a network experiences call set up failures may vary by day, region, type of user device, device software, and several other factors.

US Patent Application Publication 2016/0029228 describes the transmission of an error code when a communication session fails during a pre-establishment phase due to failure to establish a dedicated bearer on an access network. In response to the error code, the communication session is reinitiated on a second access network. While effective, communication networks may benefit from knowing the rate at which calls initiated on their networks fail prior to notification or ringing at the called party. The rate may provide network engineers and personnel with a measurable handle for optimizing and tuning the network to improve network subscriber experience.

Thus, there is a need for providing a metric for the amount of calls that fail prior to notification or ringing on a given communication network. The embodiments of the present disclosure attempt to provide a technical solution to address these needs.

SUMMARY

Embodiments disclosed herein apply to systems and methods for determining a call set up failure rate on a given communication network, triggering an indication or alert on the communication network when the call set up failure rate is above a threshold, and adjusting or optimizing parameters of the communication network in response to the alert to reduce the call set up failure rate. In one embodiment, a computer-implemented method for determining a call set up failure rate for calls initiated on a long-term evolution (LTE) communication network is disclosed. The method may include generating at least one call detail record for each of the calls initiated on the LTE communication network, aggregating the call detail records generated over a predetermined time period to provide an aggregated call detail record, and calculating the call set up failure rate from the aggregated call detail record. The method may further comprise adjusting one or more parameters of the LTE communication network when the call set up failure rate is above a threshold to reduce the call set up failure rate.

In another embodiment, a system including a communication network configured to enable calls on user devices is disclosed. The communication network may at least include a server having a processor, a memory, and a communication circuit. The processor may be physically configured according to computer-executable instructions for generating a call detail record for a call set up process for each of the calls initiated by the user devices on the communication network, aggregating the call detail records generated over a predetermined time period to provide an aggregated call detail record, and calculating from the aggregated call detail record a call set up failure rate for the initiated calls that failed during the call set up process. Additionally, the processor may be physically configured according to computer-executable instructions for communicating an alert to a network computer when the call set up failure rate is above a threshold.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

FIG. 4 is a representation of a portion of an exemplary aggregated call detail record (CDR), according to one embodiment.

DETAILED DESCRIPTION

Figure 1:
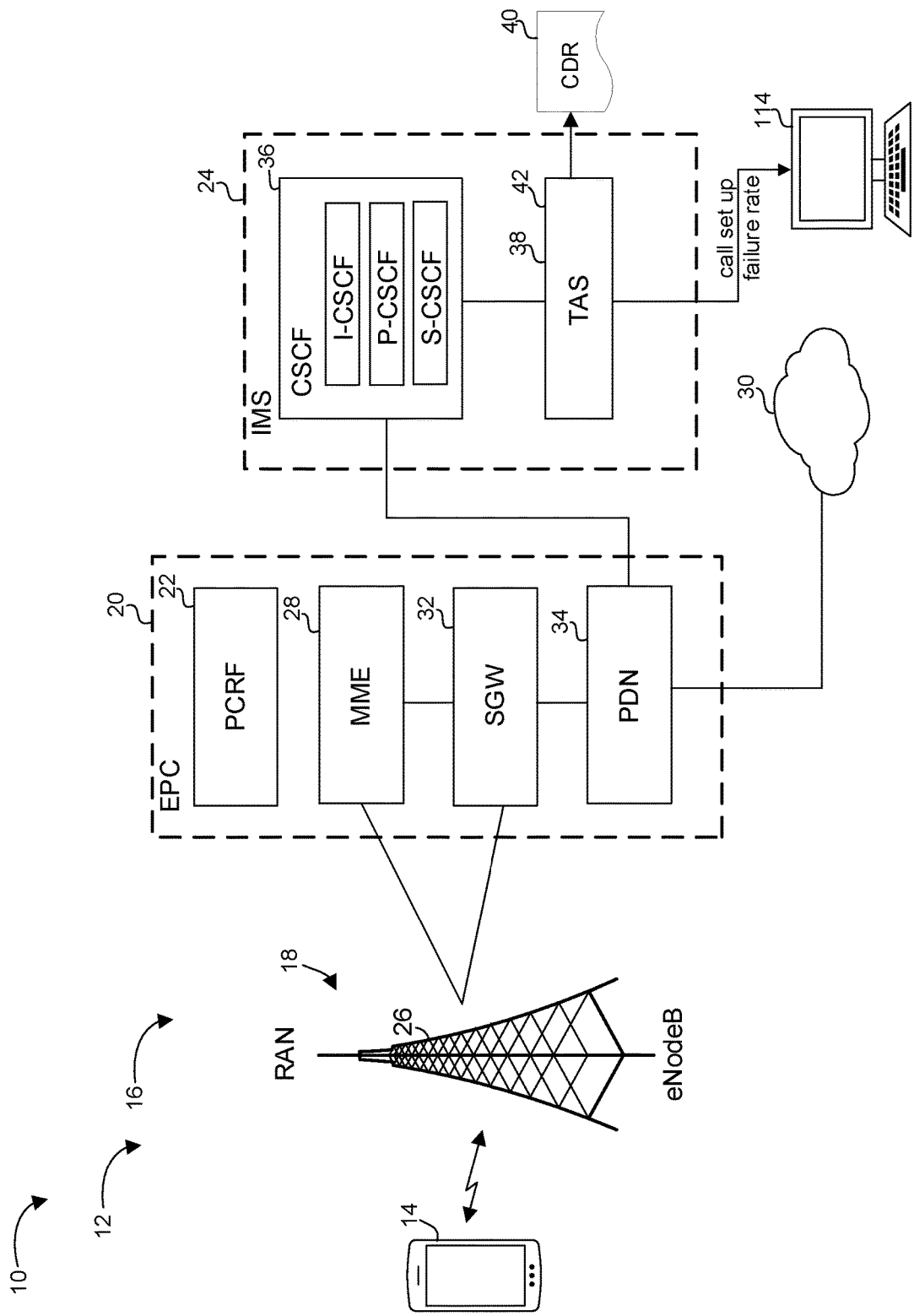
FIG. 1 is a schematic representation of a communication network, according to one embodiment.

Referring now to the drawings and with specific reference to FIG. 1, a system 10 including an exemplary communication network 12 for supporting a call between user devices 14 is shown. The user device 14 may include a smartphone, a tablet, a laptop, a personal computer, or other communication device. In one embodiment, the communication network 12 may be a 4G long term evolution (LTE) network 16 or a 5G LTE network. The LTE communication network 16 may support voice over LTE (VoLTE) calls and/or video over LTE (ViLTE) calls between user devices 14 subscribed or otherwise connected to the network 16. In the VoLTE calls, voice data is sent as prioritized data packets over the Internet to provide high definition voice quality. In some arrangements, the communication network 12 may include other types of networks such as circuit switched or WiFi networks.

The LTE communication network 16 may include a radio access network (RAN) 18 providing wireless connectivity between user devices 14, and an evolved packet core (EPC) 20 involved in call session set up and authentication, among other things. The EPC 20 may include a policy and charging rule function (PCRF) 22 which plays a role in setting up a dedicated bearer for the VoLTE call. The EPC 20 may connect to an Internet protocol (IP) multimedia subsystem (IMS) 24 involved in delivering multimedia communications (voice, video, etc.) over IP networks. The LTE communication network 16 and the IMS 24 may include many other components and features not shown and discussed here for clarity purposes.

A user device 14 connects, by way of a radio base station (eNode B) 26 of the RAN 18, to the EPC 20 which in turn connects to the IMS 24. Initially, a mobility management entity (MME) 28 authenticates the user device 14, and establishes default bearers into the Internet 30 and the IMS 24 once the user device 14 is authenticated. The MME 28 may set up an appropriate serving gateway (SGW) 32 which routes data packets to and from one or more packet data networks (PDN) 34 that connect to the Internet 30 and the IMS 24.

With the default bearers established, the user device 14 may register towards the IMS 24 for the VoLTE call via a session integration protocol (SIP) register request. The register request may be sent to a call session control function (CSCF) 36 which includes a proxy-CSCF (P-CSCF), an interrogating-CSCR (I-CSCF), and an appropriate session-CSCF (S-CSCF). The CSCF 36 is also involved in passing call invites from the user device 14 to a server 38 on the IMS 24, allowing the server 38 to generate a call detail record (CDR) 40 for a call set up process for each initiated call on the network 16 and calculate call set up failure rates (see further details below). In one embodiment, the server 38 is a telephony application server (TAS) 42.

Figure 2:
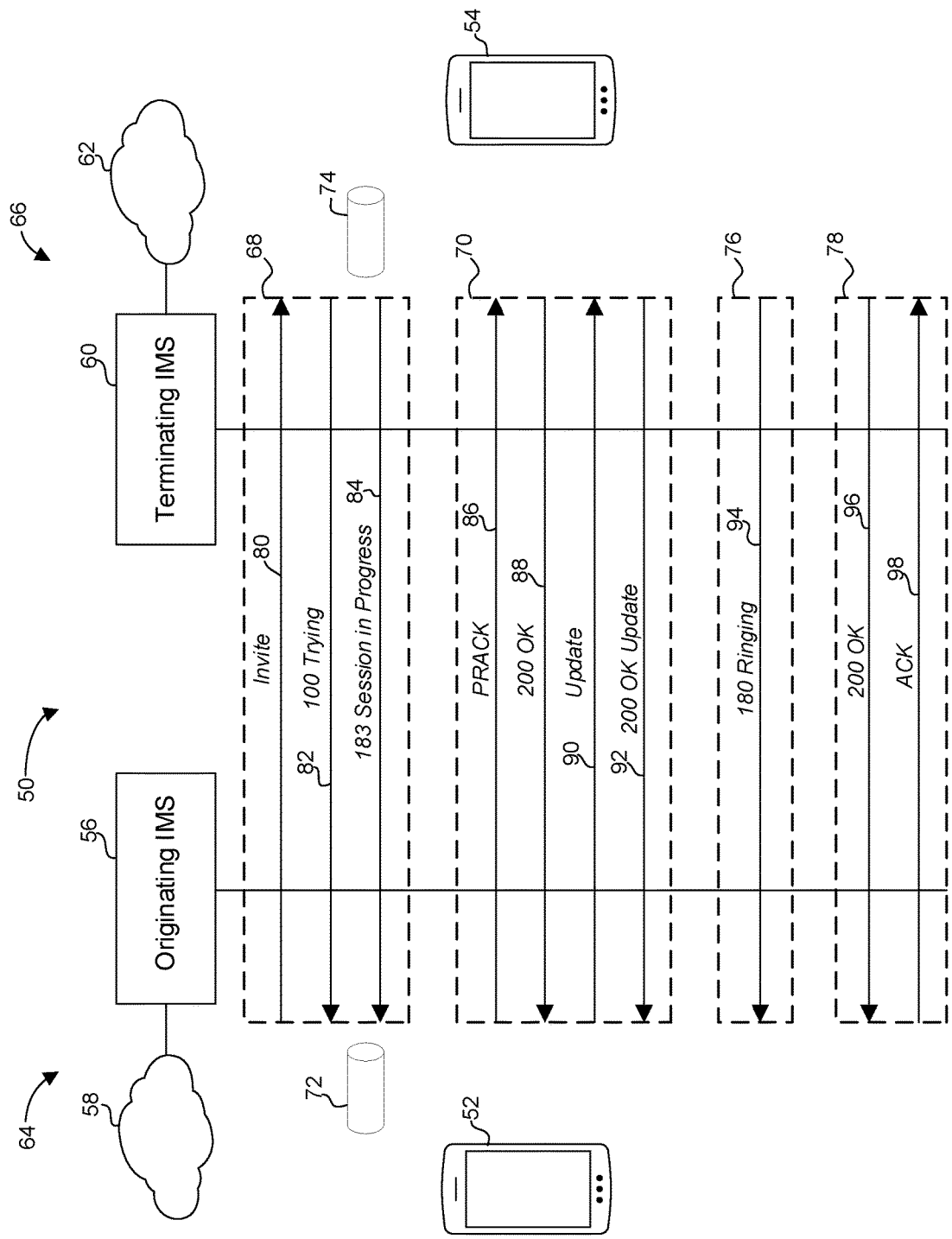
FIG. 2 is a schematic representation of an exemplary call set up process on the communication network, according to one embodiment.

FIG. 2 shows an exemplary call set up process 50 that occurs when a user device 52 of a calling party (originating user device) attempts to call a user device 54 of a called party (terminating user device) via the LTE communication network. During the call set up process 50, SIP messages are communicated between the user devices 52 and 54 via an originating IMS 56 and LTE communication network 58, and a terminating IMS 60 and LTE communication network 62. As used herein, the originating side 64 includes the calling party user device 52, the originating LTE communication network 58, and the originating IMS 56. Likewise, the terminating side 66 includes the called party user device 54, the terminating LTE communication network 62, and the terminating IMS 60. In some embodiments, the terminating side 66 may include another type of communication network, such as a circuit switched communication network or a WiFi network.

The call set up process 50 may include an attempt stage 68 and a pre-alerting stage 70 that occur prior to a notification of an incoming call (e.g., a sound, a ring, a vibration, etc.) being received at the user device 54 of the called party. The attempt and pre-alerting stages 68 and 70 may involve processes such as negotiation of codecs (code/decoders used in analog/digital conversion), decision of type(s) of media to be exchanged (audio, video, etc.), and establishment of dedicated bearers 72 and 74 on the originating and terminating sides 64 and 66, respectively. The call set up process 50 may further include an alerting/ringing stage 76 which includes ringing or other notifying signal being received at the called party user device 54, and an answering stage 78 which includes call answering at the called party user device 54. Completion of the answering stage 54 establishes the call and completes the call set up process 50. With the call set up process 50 complete, the user devices 52 and 54 may begin exchanging media (voice, audio, etc.) packets as desired during the call. The individual messages involved in each stage of the call set up process 50 are described more specifically below.

When the calling party user device 52 initiates a call to the called party user device 54, the user device 52 sends a SIP 'Invite' message 80 which informs the terminating side 66 of the incoming call. The 'Invite' message 80 includes a session description protocol (SDP) offer carrying information such as media capabilities, and information for negotiating bandwidths and codecs. The terminating side 66 may acknowledge the 'Invite' message by sending a '100 Trying' message 82. Additionally, the terminating side 66 may respond with a '183 Session in Progress' message 84 which includes an SDP answer to the SDP offer in the 'Invite' message 80. The SDP answer may contain codec information to assist the originating and terminating sides 64 and 66 in selecting a common codec supported on both of the sides 64 and 66. During this step, the dedicated bearers 72 and 74 may be created with the help of the PCRF 22 at both the originating and terminating sides 64 and 66. This may conclude the attempt stage 68 of the call set up process 50.

In the pre-alerting stage 70, the originating side 64 may send a provisional acknowledgement ('PRACK') message 86 to acknowledge the '183 Session in Progress' message 84. The 'PRACK' message 86 may also be used to communicate the final selected codec for the call. The terminating side 66 may respond to the 'PRACK' message with a '200 OK' message 88 which accepts the final selected codec offered by the originating side 64. Additionally, the originating side 64 may send a SIP 'Update' message 90 providing an updated SDP offer containing the selected codec and confirming that the local conditions are met at the originating side 64. The terminating side 66 may respond with a '200 OK Update' message 92 containing information that the conditions are met at the terminating side 66 too. If any of the above messaging steps of the attempt and pre-alerting stages 68 and 70 are not completed within a predetermined time limit measured by a network timer, the call set up process 50 may fail. Failures may be caused by delays at either of the originating or terminating sides 64 and 66.

In the alerting/ringing stage 76, the terminating user device 54 receives a notification (e.g., a ring, a sound, vibration, etc.) of an incoming call, and replies back with a '180 Ringing' response message 94. In the answering stage 78, the terminating side 66 responds with a '200 OK' message 96 to the initial 'Invite' message 80. In addition, the originating side 64 sends an 'ACK' message 98 acknowledging that the call has been answered and that the call is established. With the call established, voice (and/or video) data packets go over the dedicated bearers 72 and 74 via the originating IMS 56 and the terminating IMS 60.

Events related to the call set up process 50 such as the SIP messages, the completion or response times for the SIP messages, and the success or failure at each stage or messaging step may be captured at the server 38, allowing the server 38 to generate the CDR 40 for the call set up process 50 for both the originating and terminating sides 64 and 66 of the initiated call. In other embodiments, a CDR may be generated for the originating side 64 or the terminating side 66 only, such as when the parties are subscribed with different networks. The CDR 40 may include additional details as well such as, but not limited to, the exact date and time the call was initiated, the exact time of any call failure, the stage and/or message at which any call failure occurred, the time taken to complete or receive a response to each SIP message, the geographical location or region of the user device, the type of user device, user device software information, user profile, user name, user market information, and user network information. In one embodiment, the server 38 is the TAS 42 which may perform additional functions such as in-network answering machine functions and call forwarding.

The specific details of the LTE communication network, the IMS, and the call set up process described above pertain to an embodiment of VoLTE or ViLTE calls. It will be understood that the particular details of the call set up process may vary on different networks and/or may evolve over time. Furthermore, it will be understood that the structure and operation of the network and the call set up process may vary for other types of communication networks and call sessions.

Figure 3:
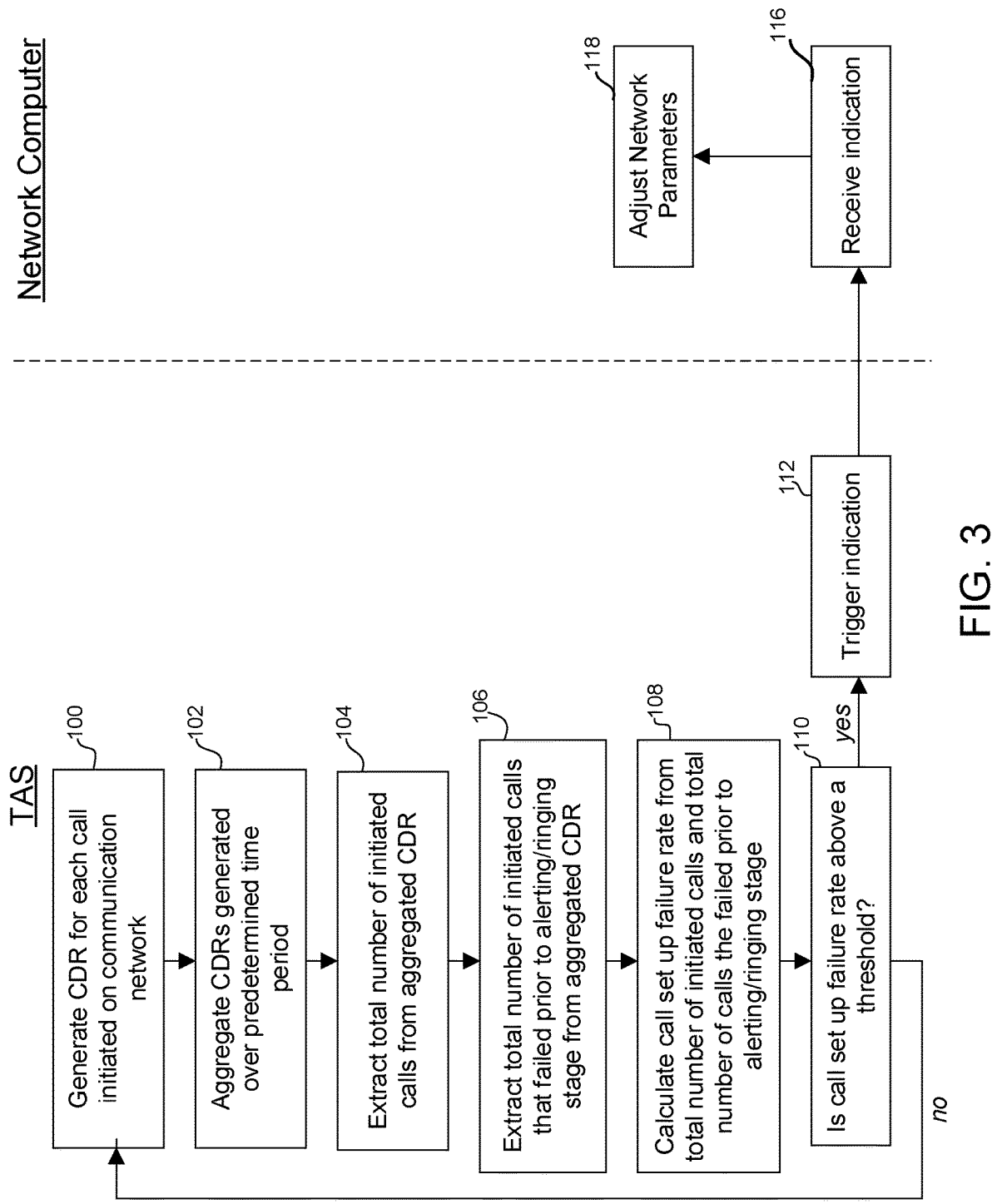
FIG. 3 is flow chart illustrating a computer-implemented method of determining a call set up failure rate on the communication network, and adjusting parameters of the communication network based on the call set up failure rate, according to one embodiment.

FIG. 3 shows a method for determining a call set up failure rate on the communication network 16 as performed by the server 38, and for adjusting parameters of the communication network 16 based on the call set up failure rate. As used herein, the call set up failure rate is a measure of the amount of initiated calls on the communication network 16 that failed during the call set up process 50 prior to ringing at the called party user device 54. That is, the call set up failure rate is a measure of the amount of initiated calls that failed during the attempt or pre-alerting stages 68 and 70 of the call set up process 50, prior to the alerting/ringing stage 76. The call set up failure rate is distinct from a call drop failure rate which is a measure of the amount of connected calls that failed after answering during the progress of the call between the parties.

At a first block 100, the server 38 may generate a CDR 40 for the call set up process 50 for each call initiated on the communication network 16. That is, the server 38 may generate a CDR for each call for which an 'Invite' message 80 is received at the server 38. If both parties are subscribed with the same network (e.g., if both or all parties are subscribers to T-Mobile), then a CDR 40 may be generated for both of the originating and terminating sides 64 and 66. In the case of a conference call, a CDR may be generated for each leg of the call if, for example, all parties are subscribed to the same network.

At a next block 102, the server 38 may aggregate or combine the CDRs 40 generated over a predetermined time period to provide an aggregated CDR. The predetermined time period may be one day, or another preselected time period. In some embodiments, the CDRs 40 of a specific market of interest may be selected and combined to generate an aggregated CDR that provides market specific information regarding call set up failures. The specific market of interest may include, for example, a selected geographical region, selected types of devices, or a particular network (e.g., T-Mobile, AT&T, etc.).

At a block 104, the server 38 may extract a total number of initiated calls from the aggregated call detail record. The number of initiated calls is equivalent to the number of 'Invite' messages 80 received at the server 38. Additionally, the server 38 may extract from the aggregated CDR the total number of initiated calls that failed prior to the alerting/ringing stage 76 (block 106). In one embodiment, the total number of initiated calls that failed prior to the alerting/ringing stage 76 (or the 'total number of call failures') is calculated according to equation (1) below, where the 'total number of calls answered' is the number of initiated calls that reached the answering stage 78, and the 'total number of calls aborted by a calling party' is the number of initiated calls that were aborted by a calling party prior to the alerting/ringing stage 76. For example, the calling party may hang up and abort the call prior to ringing/notification at the called party's device if the calling party dialed the wrong number or was interrupted. Equation (1) effectively removes as call set up failures any calls that successfully reached the answering stage 78, calls that successfully reached the alerting/ringing stage 76, and calls that were aborted by the calling party prior to ringing. Additionally, circuit switched fall backs (CSFBs) are not counted as call set up failures.

Total number of call failures=total number of initiated calls−(total number of calls answered+total number of calls that reached the alerting/ringing stage+total number of calls aborted by the calling party prior to the alerting/ringing stage)  (1)

Alternatively, the server 38 may analyze the entries in the aggregated CDR to tally the total number of calls that failed in either the attempt or pre-alerting stages 68 and 70 of the call set up process 50. At a next block 108, the server 38 may calculate the call set up failure rate from the total number of initiated calls and the total number of call failures according to equation (2) below.

Call set up failure rate=total number of call failures/total number of initiated calls  (2)

The server 38 may include the call set up failure rate in the aggregated CDR for analysis by network personnel or engineers. The server 38 may include additional details in the aggregated CDR such as the call set up process stages or specific messages in which failures are occurring more frequently, and/or the reasons for call set up failures at each stage or message. This may enable the network to target the stages/messages experiencing more failures for optimization.

At a block 110, the server 38 may determine whether the call set up failure rate is above a threshold indicating that the communication network 16 is experiencing higher than normal or desired call set up failures. The threshold may be set according to the preferences of the communication network 16. If the call set up failure rate is below the threshold, the server 38 may continue to generate and aggregate CDRs to determine the call set up failure rates over the following time periods. If the call set up failure rate is above the threshold, the server 38 may trigger an automatic indication or alert to a network computer 114 indicating that network servicing may be needed due to high call set up failures (block 112; also see FIG. 1).

The network computer 114 may receive the indication at a block 116. In response, network personnel or engineers may suitably adjust or optimize one or more parameters of the communication network 16 to reduce the call set up failure rate via the network computer 114 or another computer system (block 118). As a non-limiting example, if it is determined based on analysis of the aggregated CDR that call set up failures are occurring more frequently at the '183 Session in Progress' messages 84, time limits set on a network timer for receipt of the '183 Session in Progress' message 84 may be extended to provide the terminating side 66 with increased time to respond and prevent call set up failures at this messaging step. As another example, network adjustments may be made to improve signaling and response times during user traveling.

Alternatively, the network 16 may decide if network adjustments are needed based directly on details from the aggregated CDR without an indication or alert. For instance, in one embodiment, network personnel or engineers may receive the aggregated CDR at the network computer 114, and analyze the call set up failure rate and determine whether or not the rate is higher than desired, and if adjustment of network parameters would be beneficial to improve subscriber call experience.

Turning to FIG. 4, a portion of an exemplary aggregated CDR 120 is shown. If collected over a time period of one day, the aggregated CDR 120 may provide the date on which the calls occurred. The aggregated CDR 120 may also list the time of each initiated call (or the time that the 'Invite' messages were received at the server 38), identifying information describing the cell location from which the call was initiated, and details about the originating user device 52 and the terminating user device 54. The status of each initiated call may be provided such as whether or not the call was answered by the called party, whether or not the call was aborted by the calling party during the call set up process 50, whether or not the call failed during the call set up process 50, and the stage and/or message state at which the initiated call failed if a failure occurred. In the exemplary aggregated CDR 120, only entries 122 and 124 which experienced a failure prior to the alerting/ringing stage 76 may be counted as call set up failures. Entries 126 and 128 are not counted as call set up failures because the calls reached the answering stage 78. Entry 130 is not counted as a failure because the calling party aborted (hung up) prior to ringing at the called party's device 54, nor is entry 132 because the call reached the alerting/ringing stage 76 but was not answered by the called party.

Additional details, such as those described in the preceding paragraphs, may also be included in the aggregated CDR 120 but are not shown here for clarity purposes. The aggregated CDR 120 of FIG. 4 is exemplary, and may include other or additional details or have a different appearance in other embodiments.

Figure 5:
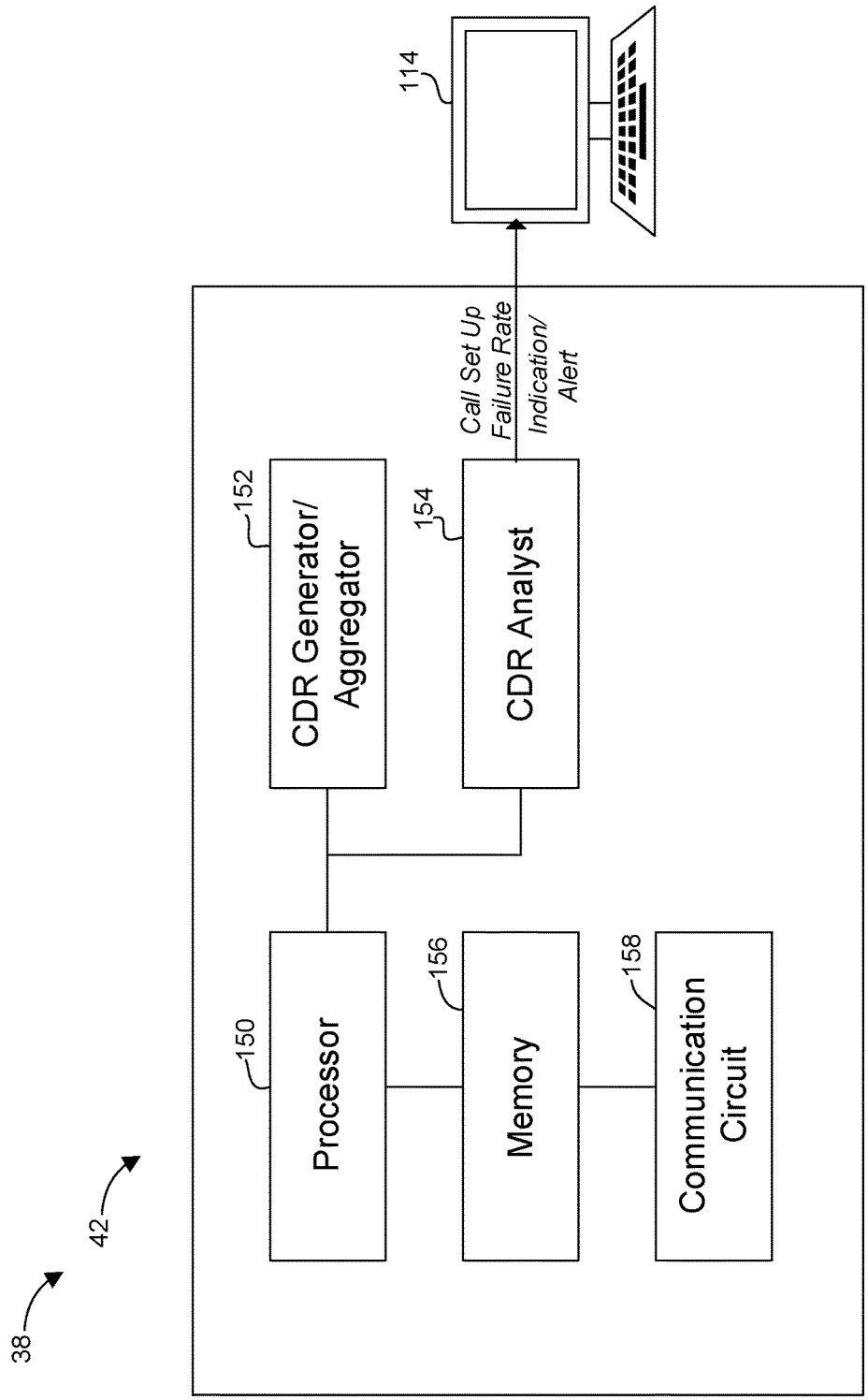
FIG. 5 is a schematic representation of components of a server on the communication network, according to one embodiment.

Certain components of the server 38 that generates the aggregated CDRs and calculates the call set up failure rates is shown in FIG. 5. In one embodiment, the server 38 is the TAS 42 on the IMS 24 as explained above. The server 38 may include a processor 150 physically configured according to computer-executable instructions for performing the various functions described above. For instance, the processor 150 may include a CDR Generator/Aggregator 152 involved in performing functions such as generating the CDRs 40 for the initiated calls, and aggregating the CDRs over the predetermined time period. The processor 150 may also have a CDR Analyst 154 which analyzes the aggregated CDR by extracting the total call failures and calculating the call set up failure rate. The server 38 may also include a memory 156 for storing the computer-executable instructions used by the processor 150, as well as other data such as the CDRs and the aggregated CDRs. A communication circuit 158 of the server 38 may be in communication with other nodes of the communication network 16 such as the CSCF 36 and the network computer 114. The communication circuit 158 may assist in outputting the aggregated CDR, the call set up failure rate, and/or an indication/alert when the call set up failure rate is above a threshold to the network computer 114. In other embodiments, another computer system, node, or program associated with the communication network 16 may perform or assist in the CDR aggregation, analysis of the aggregated CDR to provide the call set up failure rate, and/or triggering of indications/alerts to the network computer 114.

The present disclosure provides a solution for adjusting network parameters based on a metric for the calls that fail during call set up prior to ringing on a given LTE communication network. The call set up failure rate may be used as a basis for the communication network to decide when adjustments of network parameters are needed to improve subscriber experience. The metric may also provide a basis for the network to determine if any adjustments made were successful in reducing call set up failures or in targeting specific stages/messages that experience more call set up failures. An alert or indication may be triggered on the network when the call set up failure rate is above a threshold, notifying network personnel or engineers that adjustments of the network may be needed to reduce the amount of calls that fail prior to ringing. Furthermore, the call set up failure rate may be determined for a selected market on the network, providing information as to which markets (e.g., geographical regions, device types, etc.) may be experiencing more issues during call set up. In other embodiments, the call set up failure rates measured on different networks may be used to compare the performance of different network providers (T-Mobile, AT&T, etc.).

What is claimed is:

1. A computer-implemented method for adjusting network call parameters based on determining a call set up failure rate for calls initiated on a long-term evolution (LTE) communication network, comprising:
   generating, by a server, at least one call detail record for each of the calls initiated on the LTE communication network;
   aggregating, by the server, the call detail records generated over a predetermined time period to provide an aggregated call detail record;
   calculating, by the server, the call set up failure rate for the calls from the aggregated call detail record; and
   adjusting, by the server, one or more parameters of the LTE communication network when the call set up failure rate is above a threshold to reduce the call set up failure rate;
   wherein a call set up process for the initiated calls includes an attempt stage, a pre-alerting stage, and an alerting/ringing stage, and wherein the call set up failure rate is a measure of the initiated calls that failed during the attempt and pre-alerting stages of the call set up process;
   wherein the call set up failure rate excludes the initiated calls that ended after the pre-alerting stage of the call set up process;
   wherein: the call set up failure rate is calculated according to:

call set up failure rate=total number of call failures/
       total number of calls initiated on the LTE communication network, and the total number of call failures is calculated according to:

total number of call failures=total number of calls
       initiated on the LTE communication network−
       (total number of calls answered+total number of
       calls that reached the alerting/ringing stage+
       total number of calls aborted by a calling party
       prior to the alerting/ringing stage).

2. The computer-implemented method of claim 1, wherein the predetermined time period is one day.

3. The computer-implemented method of claim 1, wherein the call set up failure rate is determined for a selected market of subscribers in the LTE communication network.

4. The computer-implemented method of claim 1, wherein each of the calls includes an originating side and a terminating side, and wherein a call detail record is generated for both of the originating side and the terminating side.

5. The computer-implemented method of claim 1, wherein the calls are voice over long-term evolution (VoLTE) calls.

6. The computer-implemented method of claim 1, wherein the call set up process further includes an answering stage.

7. A system, comprising:
a communication network configured to enable calls on user devices subscribed with the communication network, the communication network at least including a server having a processor, a memory, and a communication circuit, wherein the communication network comprises a long-term evolution (LTE) communication network, the processor being physically configured according to computer-executable instructions for:
generating a call detail record for a call set up process for each of the calls initiated by the user devices;
aggregating the call detail records generated over a predetermined time period to provide an aggregated call detail record;
calculating from the aggregated call detail record a call set up failure rate for the initiated calls that failed during the call set up process; and
communicating an alert to a network computer when the call set up failure rate is above a threshold;
wherein the call set up process includes an attempt stage, a pre-alerting stage, an alerting/ringing stage, and an answering stage, and wherein the call set up failure rate excludes the calls that failed during the alerting/ringing and answering stages of the call set up process;
wherein:
the call set up failure rate is calculated according to:

call set up failure rate=total number of call failures/
total number of calls initiated on the communication network, and the total number of call failures is calculated according to:

total number of call failures=total number of calls
initiated on the communication network−(total
number of calls answered+total number of calls
that reached the alerting/ringing stage+total
number of calls aborted by a calling party prior
to the alerting/ringing stage).

8. The system of claim 7, wherein the calls include one or both of voice over long-term evolution (VoLTE) calls and video over long-term evolution (ViLTE) calls.

9. The system of claim 7, wherein the server is a telephony application server (TAS) associated with an IP Multimedia Subsystem (IMS) of the LTE communication network.

10. The system of claim 7, wherein the LTE communication network is a 4G LTE network or a 5G LTE network.

11. The system of claim 7, wherein each of the initiated calls includes an originating side and a terminating side, and wherein a call detail record is generated for one or both of the originating side and the terminating side.

12. The system of claim 7, wherein the predetermined time period is one day.

13. A computer-implemented method for adjusting network call parameters based on determining a call set up failure rate for calls initiated on a long-term evolution (LTE) network, comprising:
generating, at a server of the LTE communication network, at least one call detail record for a call set up process for each of the calls initiated on the LTE communication network;
aggregating, at the server, all of the call detail records generated over a predetermined time period to provide an aggregated call detail record;
extracting, at the server, a total number of the initiated calls that failed prior to a ringing stage of the call set up process from the aggregated call detail record;
calculating, at the server, the call set up failure rate based on the total number of initiated calls that failed prior to the ringing stage; and
adjusting, at the server, one or more parameters of the LTE network when the call set up failure rate is above a threshold, wherein:
the call set up failure rate is calculated according to:

call set up failure rate=total number of call failures/
total number of calls initiated on the LTE communication network, and the total number of call failures is calculated according to:

total number of call failures=total number of calls
initiated on the LTE communication network−
(total number of calls answered+total number of
calls that reached the ringing stage+total number of calls aborted by a calling party prior to
the ringing stage).

14. The computer-implemented method of claim 13, wherein the server is a telephony application server (TAS) associated with an IP Multimedia Subsystem (IMS) of the LTE network.

15. The computer-implemented method of claim 13, further comprising triggering, at the server, an alert to a network computer when the call set up failure rate is above the threshold.

* * * * *